United States Patent
Oguma et al.

(10) Patent No.: US 8,080,328 B2
(45) Date of Patent: Dec. 20, 2011

(54) SECONDARY BATTERY MODULE HAVING CONNECTION BREAL OFF MECHANISM IN CASE OF ABNORMAL BATTERY OPERATION

(75) Inventors: Mikio Oguma, Kumagaya (JP); Takenori Ishizu, Hitachinaka (JP)

(73) Assignee: Hitachi Vehicle Energy, Ltd., Hitachinaka-Shi (JP)

( * ) Notice: Subject to any disclaimer, the term of this patent is extended or adjusted under 35 U.S.C. 154(b) by 1065 days.

(21) Appl. No.: 11/942,236

(22) Filed: Nov. 19, 2007

(65) Prior Publication Data

US 2008/0118824 A1    May 22, 2008

(30) Foreign Application Priority Data

Nov. 21, 2006  (JP) ................... 2006-314165
Nov. 21, 2006  (JP) ................... 2006-314406

(51) Int. Cl.
  *H01M 2/00*    (2006.01)
(52) U.S. Cl. ........................................ 429/121; 429/61
(58) Field of Classification Search ............. 429/7, 61, 429/121
  See application file for complete search history.

(56) References Cited

U.S. PATENT DOCUMENTS

| | | | |
|---|---|---|---|
| 5,026,615 A * | 6/1991 | Tucholski ................. | 429/61 |
| 6,391,491 B1 | 5/2002 | Kim | |
| 2003/0151393 A1* | 8/2003 | Takano ................. | 320/150 |
| 2005/0214634 A1 | 9/2005 | Kim | |

FOREIGN PATENT DOCUMENTS

| | | |
|---|---|---|
| CN | 1309431 A | 8/2001 |
| JP | 60-230354 A | 11/1985 |
| JP | 2004-178994 A | 6/2004 |
| JP | 2004-199991 A | 7/2004 |
| WO | 2006/118386 A1 | 11/2006 |

OTHER PUBLICATIONS

Office Action issued by the State Intellectual Property Office of China in corresponding Chinese Patent Application No. 200710186665.6.
European Office Action dated Jun. 30, 2010 issued in corresponding European Patent Application No. EP 07 121 126.2.
European Search Report dated Mar. 13, 2008 from corresponding European Patent Application No. EP 07 12 1126.

* cited by examiner

*Primary Examiner* — Barbara Gilliam
*Assistant Examiner* — Maria J Laios
(74) *Attorney, Agent, or Firm* — Roberts Mlotkowski Safran & Cole, P.C.

(57) ABSTRACT

The present invention provides a secondary battery module capable of securing safety at a time of abnormal battery operations by using a film-type secondary battery. A module 30 is provided with 8 pieces of single batteries 20 each using a laminate film as its battery container. The 8 pieces of single batteries are disposed in a layer-stacked state. A conducting plate 17 is placed in a manner to face one single battery 20a disposed at one end of the 8 pieces of the single batteries 20. A pushing member 14 is formed between the single battery 20a and conducting plate 17. A conducting plate 18 is disposed on a side of the conducting plate 17 opposite to the pushing member 14. The pushing member 14 has projected portions 14b. The conducting member 17 has through-holes 17a formed so that the projected portions are able to pass through. The conducting plates 17 and 18 are coupled by a coupling portion 21. When any one of the single batteries 20 and single battery 20a expands at a time of abnormal battery operations, the projected portions pass through the through-holes to break off the coupling at the coupling portion 21.

6 Claims, 4 Drawing Sheets

SECONDARY BATTERY MODULE HAVING CONNECTION BREAL OFF MECHANISM IN CASE OF ABNORMAL BATTERY OPERATION

FIELD OF THE INVENTION

The present invention relates to a secondary battery module, and more particularly to the secondary battery module having a single battery housed in a battery container made of a flexible member or a plurality of unit cells each being disposed in a layer-stacked state, housed in a battery container made of a flexible member and connected to one another in series or in series and parallel.

DESCRIPTION OF THE RELATED ART

Conventionally, as a power source for charging or discharging large currents for pure electric vehicles (PEVs) and/or hybrid electric vehicles (HEVs), a secondary battery module made up of a plurality of cylindrical and sealed-type secondary batteries connected to one another in series or in series and parallel. Generally, for example, forty to one hundred pieces of cylindrical and sealed-type secondary batteries are used for such a power source for charging or discharging large currents.

As a material for a cylindrical container for the cylindrical and sealed-type secondary battery, an iron material is widely employed to reduce costs. However, a high specific gravity of iron constitutes a large restriction on enhancement of efficiency with respect to weight (or on achievement of light-weightness) of the secondary battery. This problem is common in a small-sized sealed-type lead-acid battery using an injection-molded resin container; that is, there is a problem that, even in the case of using a resin, it is difficult not only to decrease the secondary battery in weight but also to increase its efficiency with respect to volume due to a wall-thickness of the container.

To solve this problem, a conventional secondary battery technology is disclosed (ex. JP-A-S60-230354) which uses a flexible material such as a laminate film (hereinafter, simply a "film") for its battery container in which an aluminum foil or the like serving as a gas barrier layer is incorporated into an inner layer, with an aim of making the secondary battery lightweight. The secondary battery module employing a film-type secondary battery (laminate battery) as a unit cell enables an entire battery to be lightweight owing to its lightweight unit cell. Generally, to constitute a secondary battery module using a film-type secondary battery, a plurality of unit cells is disposed in a layer-stacked state.

Moreover, in the secondary battery, if overcharge should occur due to a failure and/or misuse of a charging device or when the secondary battery is used in an atmosphere of high temperature, the secondary battery gets into an abnormal state in which its internal pressure is increased due to gas produced by vaporization, decomposition, or the like of an electrolytic solution caused by an abnormal rise of the battery temperature. To prevent this, in the case of using the cylindrical sealed-type secondary battery, a current interrupting mechanism to interrupt currents at a time of the abnormal battery operations is incorporated therein. In the current interrupting mechanism, for example, a weak coupling portion is formed within a secondary battery which is configured to be ruptured at a time of the rise of an internal pressure, as a result, interrupting currents. Also, technology is disclosed (ex. JP-A-2004-178994) in which currents are interrupted at a time of a rise in temperature by mounting a temperature fuse or a PTC (Positive Temperature Coefficient) element on an upper portion of an aperture sealing plate to seal an aperture portion of a bottom-bearing tubular battery can. The current interrupting mechanism can be easily provided in the conventional cylindrical and sealed-type secondary battery, however, in a thin and rectangular battery using a rectangular battery can, it is difficult to mount the current interrupting mechanism therein from the viewpoint of volume efficiency. Technology to solve this problem is disclosed (ex. JP-A-2004-199991) in which, for example, a step portion is formed in a rectangular battery can, on which a temperature fuse or PTC element is mounted.

However, the film-type secondary battery described above has a very simple structure in which a group of electrodes is covered with a film and, therefore, it is difficult to embed the current interrupting mechanism in each unit cell. Moreover, due to flexibility of films, formation of such a step portion as described in the JP-2004-199991 is also difficult. As a result, a problem arises that, if overcharge should occur, currents continue to flow, which makes it impossible to decrease an internal pressure thereof, causing the expansion of a battery container. Thus, by the secondary battery module using the film-type secondary battery as described above, it is difficult to secure safety when abnormality occurs in the battery.

SUMMARY OF THE INVENTION

In view of the above circumstances, an object of the present invention is to provide a secondary battery module which is capable of securing safety at a time of abnormal battery operations by using a film-type secondary battery.

In order to achieve the object, the present invention provides a secondary battery module having a single battery housed in a battery container made of a flexible member or a plurality of unit cells each being disposed in a layer-stacked state, housed in a battery container made of a flexible member and connected to one another in series or in series and parallel comprising a connecting member disposed so as to face a single battery or a unit cell disposed at one end of the plurality of unit cells and to connect the single battery or the unit cell disposed at one end of the plurality of unit cells with an external output terminal, and a pushing member placed between the single batter or the unit cell disposed at one end of the plurality of unit cells and the connecting member, and the pushing member, when the single battery or any one of the plurality of unit cells expands, breaks off the connection established by the connecting member between the single battery or the unit cell disposed at one end of the plurality of unit cells and the external output terminal.

According to the present invention, at a time of ordinary operations, by the connecting member placed so as to face the single battery or the unit cell disposed at one end of the plurality of unit cells, the single battery or the unit cell disposed at one end of the plurality of unit cells is connected to the external output terminal and, therefore, power from the single battery or the unit cell is output to the external output terminal. On the other hand, the pushing member is disposed between the single battery or the unit cell disposed at one end of the plurality of unit cells and the connecting member and, at a time of abnormal battery operations, that is, when the single battery or any one of the plurality of unit cells expands, the pushing member breaks off the connection established by the connecting member between the single battery or the unit cell disposed at one end of the plurality of unit cells and the external output terminal and, therefore, even when overcharge occurs (in the secondary battery module), safety of the secondary battery module can be secured.

According to the present invention, the connecting member includes a first connecting member having through-holes being formed and placed so as to face the single battery or the unit cell disposed at one end of the plurality of unit cells and a second connecting member disposed on a side of the first connecting member opposite to the pushing member so as to face the first connecting member and having a coupling portion with the first connecting member and the pushing member has projected portions able to pass through the through-holes formed in the first connecting member and one of the first connecting member and the second connecting member is connected to the single battery or the unit cell disposed at one end of the plurality of unit cells and another of the first connecting member and the second connecting member is connected to the external output terminal and, when the single battery or any one of the plurality of unit cells expands, the projected portions of the pushing member are allowed to pass through the through-holes formed in the first connecting member so that rupture of said coupling portion takes place.

In the aspect as described above, at a time of ordinary operations, the first connecting member having through-holes being formed and placed so as to face the single battery or the unit cell disposed at one end of the plurality of unit cells is connected to the second connecting member disposed so as to face the first connecting member with the coupling portion interposed between the first and second connecting members and one of the first connecting member and the second connecting member is connected to the single battery or the unit cell disposed at one end of the plurality of unit cells and another of the first connecting member and the second connecting member is connected to the external output terminal and, therefore, power is output to the external output terminal through the first and second connecting member. On the other hand, the pushing member having projected portions able to pass through the through-holes formed in the first connecting member is disposed and, therefore, at a time of abnormal battery operations, when the single battery or any one of the plurality of unit cells expands, the projected portions of the pushing member pass through the through-holes formed in the first connecting member, causing the coupling portion between the first and second connecting members to rupture and breaking off the connection between the first and second connecting members, which enables safety of the secondary battery module to be secured.

In the above aspect, a central portion of the second connecting member is projected at a side of the first connecting member and, therefore, by forming the coupling portion approximately in a center of the projected central portion, the projected central portion of the second connecting member is deformed by the pushing member to be projected in a reverse direction and does not return to its original state, thereby preventing the second contact between the first and second connecting members having the broken coupling portions. Also, by forming the first connecting member so as to have the through-holes in proximity to its coupled portion, a portion near to the coupling portion between the first and second connecting members is pushed by the projected portions of the pushing member, thereby readily inducing the breakage in the coupling portion. Here, by allowing the pushing member to have a plurality of projected portions and by making a length of projection of each of said plurality of projected portions be the same and by forming the through-holes having the same number as the plurality of projected portions in the first connecting member, portions near to the coupling portion are pushed by the plurality of projected portions, thereby reliably breaking the coupling portion. Also, by bonding a resin plate having rigidity to the single battery or the unit cell disposed at one end of the plurality of unit cells, even when bias occurs in the deformation caused by expansion of the single battery or the unit cells, the pushing member can be reliably pushed via the resin plate. Also, by making a battery capacity of the unit cell disposed at one end of the plurality of unit cells be smaller than that of each of unit cells other than the unit cell disposed at one end of the plurality of unit cells, the rise in the internal pressure of the unit cell disposed at one end of the plurality of unit cells occurs earlier than that of other unit cells, thereby reliably activating the pushing member. Now, preferably, the battery capacity of the unit cell disposed at one end of the plurality of unit cells is 3 percent to 9 percent smaller than that of each of unit cells other than the unit cell disposed at one end of the plurality of unit cells.

Also, the secondary battery module may be configured so that the pushing member is disposed in a manner to be contactable to the connecting member, and the connecting member has a weak portion in its partial place and one of its ends sandwiching the weak portion is in contact with the single battery or the unit cell disposed at one end of the plurality of unit cells and another of its ends sandwiching the weak portion is in contact with the external output terminal and, when the single battery or any one of the plurality of unit cells expands, the weak portion is ruptured by the pushing member.

In the aspect as described above, at a time of ordinary operations, one of ends of the connecting member having a weak portion in its partial place so as to face the single battery or the unit cell disposed at one end of the plurality of unit cells is connected to the single battery or the unit cell disposed at one end of the plurality of unit cells and another of ends of the connecting member is connected to the external output terminal and, therefore, power from the single battery or the unit cells is output through the weak portion to the external output terminal. On the other hand, since the pushing member formed in a manner to be contactable to the connecting member is placed between the single battery or the unit cell disposed at one end of the plurality of unit cells and the connecting member, when the single battery or any one of the plurality of unit cells expands at a time of abnormal battery operations, the pushing member is pushed and moved, thus resulting in the rupture of the weak portion of the connecting member and in the breakage-off of connection between the single battery or the unit cell disposed at one end of the plurality of unit cells and the external output terminal, thereby securing safety of the secondary battery module.

In this aspect, a supporting member disposed at a side of the connecting member opposite to the pushing member to support the connecting member and a separating member to separate both ends of the broken weak portion from each other when the rupture takes place in the weak portion are further provided and, by disposing the pushing member and the supporting member at opposite sides relative to the weak portion and by locating the separating member at a position on the connecting member side of the supporting member or the pushing member to correspond to the weak portion, the separating member separates both the ends of the broken weak portion, thereby preventing a second contact between both the ends of the broken weak portion. In this case, the separating member may be formed integrally with the pushing member or the supporting member.

DETAILED DESCRIPTION OF THE PREFERRED EMBODIMENTS

First Embodiment

Hereinafter, a secondary battery module of the present invention according to the first embodiment is described by referring to drawings.

(Constitution)

Figure 1:
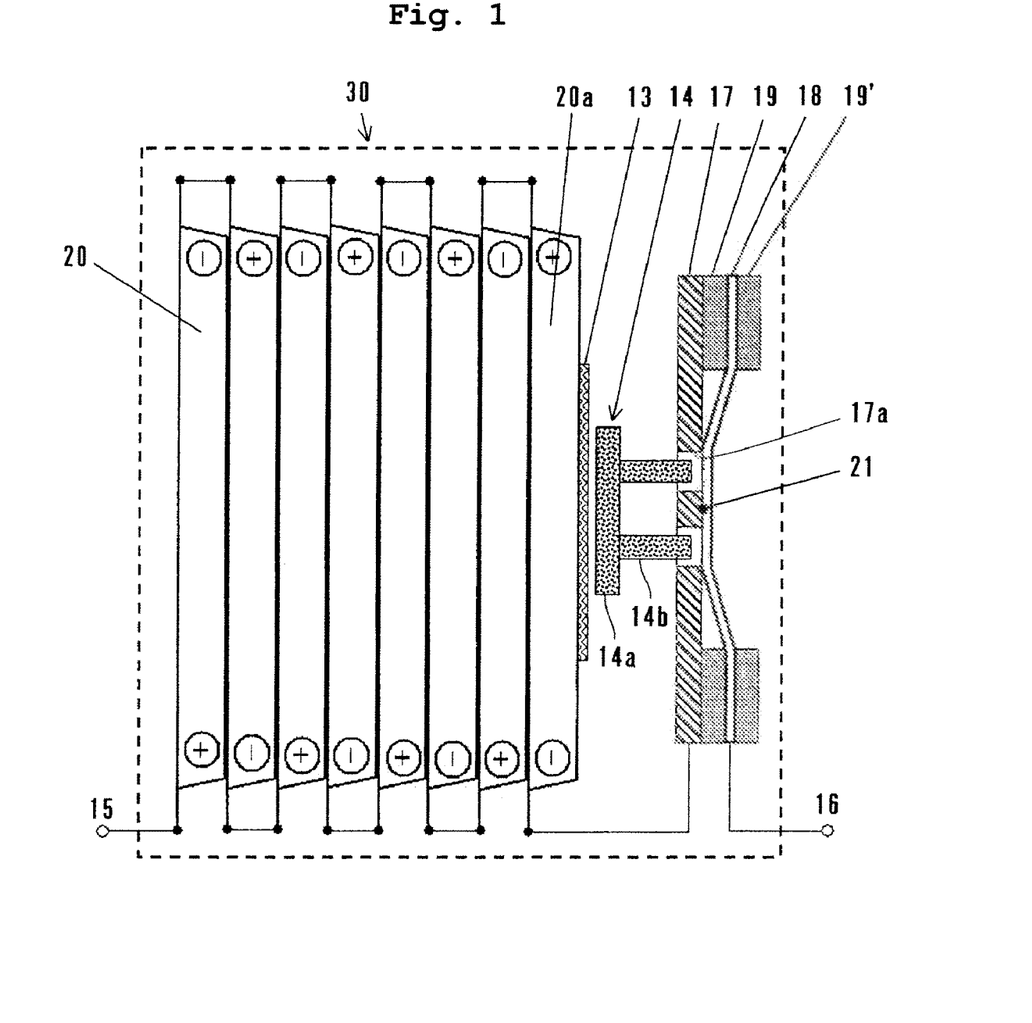
FIG. 1 is a view schematically showing a secondary battery module according to the first embodiment of the present invention.

As shown in FIG. 1, the secondary battery module 30 (hereinafter, simply a "module") of the embodiment has 8 pieces of film-type lithium ion secondary batteries 20 (hereinafter, simply as "single batteries" serving as unit cells) each using a laminate film serving as a flexible member for a battery container. In the module 30, the 8 pieces of single batteries 20 and entire components such as a connecting member or the like described later are incorporated into a frame made of an aluminum alloy (not shown).

Each of the single batteries 20 has plane portions on two surfaces facing each other. The 8 pieces of the single batteries 20 are disposed so that positive and negative electrodes thereof are arranged in an alternating manner. The plane portions of each of the single batteries 20 adjacent to one another are placed so as to face one another and the single batteries 20 adjacent to one another are bonded with a double-faced tape. That is, the 8 pieces of the single batteries 20 are arranged in a layer-stacked state. A terminal of each of the single batteries 20 adjacent to one another is coupled to each other by resistance welding using a nickel plate being a connecting member and the 8 pieces of single batteries 20 are serially connected thereto. A battery capacity of one single battery 20a disposed at one end of the 8 pieces of single batteries 20 is set to be 3 to 9 percent smaller than that of other 7 pieces of single batteries 20. In the first embodiment, a battery capacity of the single battery 20a is 5 percent smaller than that of each of other single batteries 20. A positive electrode of the single battery 20 (at another end of the 8 pieces of single batteries 20) is connected to an external terminal 15 of one positive electrode making up the module 30.

To an approximately central portion of the plane portion in the single battery 20a on a side opposite to the other single batteries 20 adjacent to each other is bonded, in a fixed state by the double-faced adhesive tape or the like, a circular plate-like pressure receiving plate 13 adapted to receive pushing power caused by expansion force produced when any one of the single batteries 20 and single battery 20a expands. The pressure receiving plate 13 is made of materials such a phenolic resin having electrical non-conductivity and rigidness. The size of the pressure receiving plate 13 is set to be smaller than that of the plane portion of the single battery 20a. On a side of the pressure receiving plate 13 opposite to the single battery 20a is disposed a pushing member 14 adapted to interrupt currents flowing when the single batteries 20 and single battery 20a expand. The pushing member 14 has a circular plate-like base portion 14a on the pressure receiving plate 13 side. One face of the base portion 14a on the pressure receiving plate 13 side is formed to have a plane shape so that the base portion 14a can be in contact with the pressure receiving plate 13. The size of the base portion 14a is set to be smaller than that of the pressure receiving plate 13. On a surface of the base portion 14a opposite to the pressure receiving plate 13 (on another side facing the pressure receiving plate 13) are formed two approximately cylindrical projected portions 14b. The length of projection of each of the two projected portions 14b is the same. As a result, the cross section of the pushing member 14 has an approximately "π" character shape.

On a side of the pushing member opposite to the pressure receiving plate 13 is disposed a circular plate-like conducting plate 17 made of an aluminum alloy serving as the first connecting member. That is, the conducting plate 17 is disposed so as to face the single battery 20a. In positions of the conducting plate 17 corresponding the projected portions 14b of the pushing member 14, the two circular through-holes 17a through which the projected portions 14b are allowed to pass. In other words, the through-holes 17a having the same number as the projected portions 14b are formed in the conducting plate 17. On a side of the conducting plate 17 opposite to the pushing member 14 is disposed a conducting plate 18 made of an aluminum alloy and having a disc-like (dish-like) shape as the second connecting member. A central portion of the conducting plate 18 has a plane shape and is projected on the conducting plate 17 side. The through-holes 17a formed in the conducting plate 17 are covered by the projected central portion of the conducting plate 18. Both the central portions of the conducting plate 17 and conducting plate 18 are coupled to each other at one point of the coupling portion 21 by FSW (Friction Stir Welding). Therefore, the projected portions 14b of the pushing member 14 are allowed to pass through the through-holes 17a formed in the conducting plate 17 and, as a result, ends of the projected portions 14b come into contact with the conducting plate 18. The portion surrounding the conducting plate 18 is located apart from the portion surrounding the conducting plate 17 and a circular ring-like insulating member 19 is placed between the portion surrounding the conducting plate 18 and portion surrounding the conducting plate 17. In the portion surrounding the conducting plate 18 on a face opposite to the conducting plate 17 is disposed an insulating member 19' so as to correspond to the insulating member 19.

The conducting plate 17 is connected to a terminal of a negative electrode of the single battery 20a and the conducting plate 18 is connected to an external terminal 16 (external output terminal) of a negative electrode of the module 30. Therefore, the conducting plates 17 and 18 are coupled to each other at the coupling portion 21, and the terminal of the single battery 20a, conducting plate 17, coupling portion 21, conducting plate 18, and the external terminal 16 of the negative electrode make up a conductive path on the negative electrode side.

Figure 2:
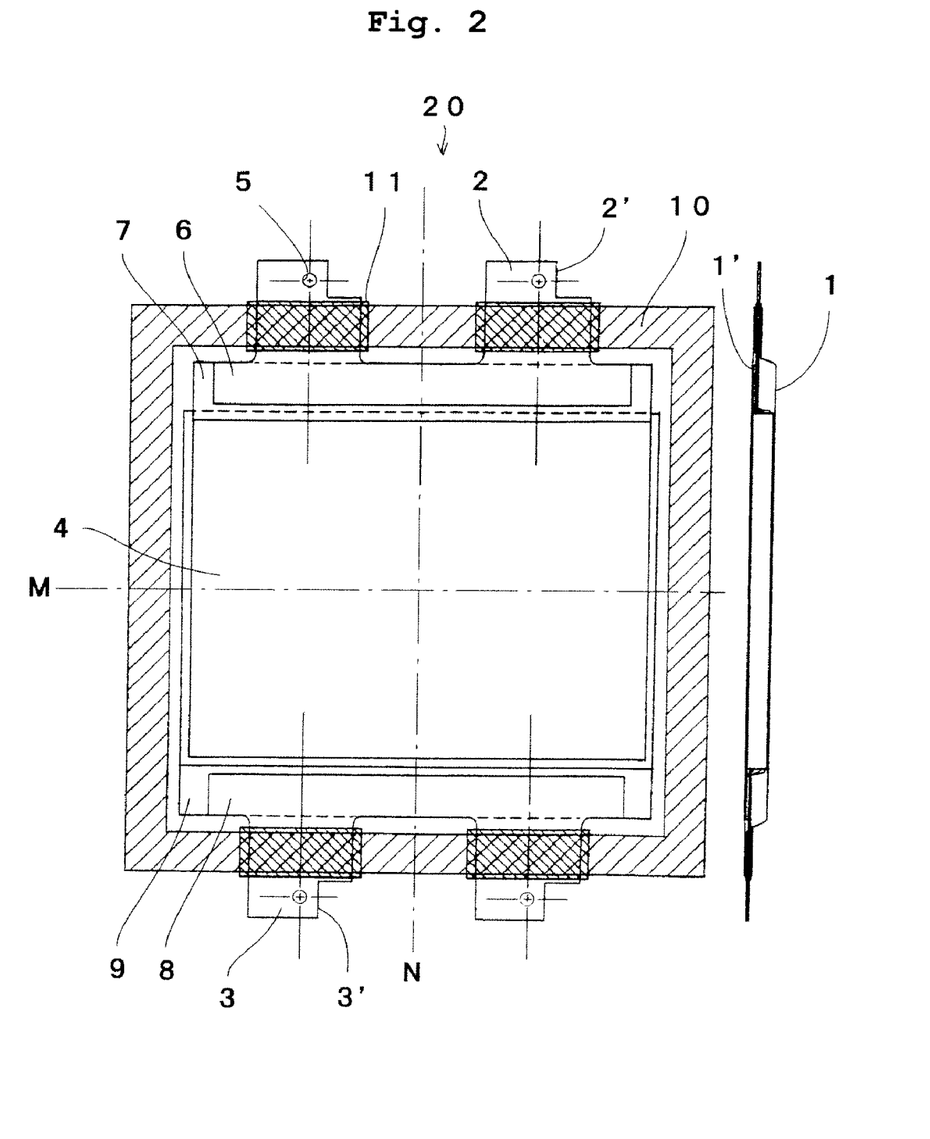
FIG. 2 is a plane and side cross-sectional view showing a film-type secondary battery making up the secondary battery module from which a convex-shaped film is removed according to the first embodiment of the present invention.

An exterior body (battery container) of each of the single batteries 20 being used for the module 30 is made up of two pieces of rectangular laminate films 1, 1' (hereinafter simply a "film"). The films 1, 1' with its film thickness of about 120 μm is made of polypropylene (PP) films, aluminum foil, and polyethylene terephthalate (PET) all of which overlap in turn with one another. An electrode group 4 is disposed in a sealed manner between the films 1, 1'. The film 1' placed on the electrode group 4 side is a plane film having a plane shape and the film 1 placed on a side opposite to the film 1' is a cup-like film having a convex shape in its approximately central portion. On two sides facing the film 1' are disposed two positive electrode terminals 2 and two negative electrode terminals 3 with their tip portions being projected on outsides in directions being opposite to one another. On four sides in portions surrounding the films 1, 1' is placed the weld portion 10 sealed by heatseal and each of the single batteries 20 has a sealed structure. The positive electrode terminals 2 and negative electrode terminals 3 respectively are sandwiched by the weld portion 10 with sealing members (adhesives) 11 interposed between the weld portion 10 and the terminals 2 or 3.

The electrode group 4 is made up of 19 pieces of positive electrode plates and 20 pieces of negative plates, all of which are alternately stacked. The positive electrode plates are inserted into a separator formed by heatseal so as to have a envelope-like shape. The separator is made of, for example, a polyethylene porous film being 25 μm in thickness and 100 mm in width. The positive electrode plates and negative electrode plates are stacked such that positive electrode terminals 2 and negative electrode terminals 3 are drawn out in directions opposite to each other. The positive electrode terminals 2 and negative electrode terminals 3 are disposed so as to be symmetric with respect to a central line M between two sides of the films 1, 1' being opposite to each other. The two positive electrode terminals 2 and two negative electrode terminals 3 are formed in a position being symmetric with respect to a central line N passing through a center (center between two sides facing each other) of each of the positive electrode strap portion 6 and the negative electrode strap portion 8 and orthogonal to the central line M.

The positive electrode strap portion 6 formed integrally with the positive electrode terminals 2 is made of an aluminum alloy A3003-H12 with its thickness of 0.3 mm and on one face of only a portion (portion exposed to the outside of the battery) of the positive electrode terminal 2 being free from a fear of contact with an electrolytic solution is formed a nickel plate with a thickness of 0.1 mm by cladding processing. On the other hand, the negative electrode strap portion 8 formed integrally with the negative electrode terminals 3 is made of a copper plate C1020-1/2H being 0.3 mm in thickness and on both sides only in a portion of the negative electrode terminals 3 exposed outside of the battery is formed a nickel plate being 0.05 mm in thickness by cladding processing. A positive electrode strap portion 6 and negative electrode strap portion 8 are ultrasonic welded respectively on a free-space portion 7 of a positive electrode current collector and a free-space portion 9 of a negative electrode current collector. In an approximately central portion in a direction of a drawing width of each of the positive electrode terminals 2 and negative electrode terminals 3 are respectively formed circular reference holes 5 for positioning. As a result, the reference hole 5 formed in each of the negative electrode terminals 3 is placed so as to be symmetric with respect to the central line M. At one end in a direction of a drawing width of each of the positive electrode terminals 2 and negative electrode terminals 3 are formed a rectangular notched portion 2' and a rectangular notched portion 3'. The thickness of the electrode group 4 is about 4.8 mm.

To assemble the single batteries 20, the electrode group 4 is put in an approximately central portion of the film 1 on which the film 1' is overlaid and the weld portions 10 on four sides are heatsealed. At this time point, after a predetermined amount of an electrolytic solution is injected from a coupling face of the films 1, 1' left partially without being heatsealed by using an injector, this portion left partially without being heatsealed is heatsealed to complete the manufacturing of the single battery 20. In this embodiment, the width of the weld portion 10 is about 10 mm over its entire circumference. During the time of a series of assembling processes, by inserting pins (not shown) in the reference holes 5 so that positioning of the positive electrode terminals 2 and negative electrode terminals 3 is performed, a required dimensional accuracy for each component can be obtained. Every two positive electrode terminals 2 and negative electrode terminals 3 are drawn and routed from two sides facing each other of the film-like container respectively through the positive electrode strap portion 6 and negative electrode strap portion 8. Moreover, a battery capacity of the fabricated single battery is about 3.2 Ah. The single battery 20a is fabricated in the same way as for the single batteries 20 except that the electrode group 4 is constituted by using 18 pieces of positive electrode plates and 19 pieces of negative electrode plates.

To fabricate the positive electrode plate making up the electrode group 4, lithium manganese oxide with an average particle diameter of 10 μm, carbon powder with an average particle diameter of 3 μm, and polyvinylidene fluoride (product name: KF#120, KUREHA Corporation) serving as a binding agent are dispersed and mixed in N-methyl-2-pyrrolidone serving as a solvent to produce slurry. The slurry is applied to both the surfaces of an aluminum foil serving as the positive electrode current collector with its thickness of 20 μm and, after being dried, the aluminum foil with the slurry are pressed and integrated. Then, the integrated slurry and aluminum foil are cut to be 94 mm in width to manufacture a slim and rectangular paper-like positive electrode plate. The coated portion of the positive electrode plate is set to be 86 mm in width and its free-space portion (reference number 7 in FIG. 1) is set to be 10 mm in width.

On the other hand, to fabricate the negative electrode plate, carbon particles with an average particle diameter of 20 μm, polyvinylidene fluoride (product name: KF#120, KUREHA Corporation) serving as a binding agent are put together into N-methyl-2-pyrrolidone serving as a solvent and mixed therein to produce slurry. The slurry is applied to both the surfaces of a copper foil serving as the negative electrode current collector with its thickness of 10 μm and, after being dried, the copper foil with the slurry are pressed and integrated. Then, the integrated slurry and copper foil are cut to be 96 mm in width to fabricate the negative electrode plate. The coated portion of the negative electrode plate is set to be 88 mm in width and its free-space portion (reference number 9 in FIG. 1) is set to be 10 mm in width.

(Actions or the Like)

Next, actions or the like of the module 30 of the first embodiment are described.

In the module 30 of the first embodiment, the conducting plate 17 connected to the negative terminal of the single battery 20a is also connected to the conducting plate 18 coupled through the coupling section 21 to the negative electrode external terminal 16. As a result, during ordinary operations of the module 30, power from each of single batteries 20 and single battery 20a is output through the conducting plates 17 and 18 to the negative electrode external terminal 16.

When the film-type secondary battery is used for single batteries making up the conventional secondary module, since the film-type secondary battery achieves a very simple structure by covering electrode groups with films, it is difficult to embed a current interrupting mechanism such as a temperature fuse, PTC element, or the like into each of the single batteries. As a result, if overcharge should occur, currents continue to flow which makes it impossible to decrease an internal pressure thereof, thus causing expansion of the battery container and making it difficult to secure safety at a time of abnormal battery operations. In the module of the first embodiment, the conducting plate 17 is disposed in a manner to face the single battery 20a and the pushing member 14 is placed between the single battery 20a and conducting plate 17, and the conducting plate 18 is mounted on a side of the conducting plate 17 opposite to the pushing member 14. That is, the pushing member 14, conducting plate 17, and conducting plate 18 are arranged in this order. The through-holes 17a through which the projected portions 14b of the pushing member 14 are allowed to pass are formed and the conducting plates 17 and 18 are coupled to each other in the coupling portion 21. In the module 30, if overcharge occurs due to a failure of the device therein or if the module is used in a high temperature atmosphere, each of the batteries gets into an abnormal state in which gas is generated within the batteries due to evaporation, decomposition, or the like of the electrolytic solution, thus causing a rise in the internal pressure thereof. When any one of the single batteries 20 and single battery 20a expands due to the rise in the internal pressure, the pressure receiving plate 13 strikes and comes into contact with the base portion 14a of the pushing member 14, which causes the pushing member 14 to be pressed toward the conducting plate 17 side. As a result, the projected portions 14b pass through the through-holes 17a of the conducting plate 17 which causes tip portions of the projected portions 14b to get into contact with the conducting plate 18 and the conducting plate 18 to be pushed by the projected portions 14b. This causes the coupling of the coupling portion 21 of the conducting plates 17 and 18 to be released (disengaged) and, therefore, the conducting plates 17 and 18 are disconnected from each other, causing the interruption of the negative-side conducting path. Therefore, in the module of the embodiment, further passage of electric currents is prevented, thereby enabling safety to be secured even at a time of increased internal pressures.

Also, in the module 30 of the first embodiment, the conducting plate 18 projects on the conducting plate 17 side. The conducting plate 18, when the coupling portion 21 is broken by being pushed by the projected portions 14b, is deformed in a reverse direction, that is, so as to be projected on a side opposite to the conducting plate 17. Therefore, if an internal pressure decreases due to the breakage of the battery container, due to lowering of the battery temperature or the like after the interruption of currents, the conducting plate 18 does not return to its original state and the conducting plate 17 does not come into second contact with the conducting plate 18, thereby preventing the flow of currents. Moreover, in the module 30 of the first embodiment, the projected portions 14b of the pushing member 14 are formed in close proximity to a center of the base portion 14a. As a result, the central portion of the conducting plate 17 is coupled to the central portion of the conducting plate 18 in the coupling portion 21 and, therefore, if any one of the single batteries 20 and single battery 20a expands, tips of the projected portions 14b come into contact with the conducting plate 18 in close proximity to the coupling portion 21. This causes reliable and easy rupture of the coupling portion by expansion force of the single batteries 20 and single battery 20a. Moreover, owing to the same projection length of the projected portions 14b, the expansion force of the single batteries 20 and single battery 20a acts approximately equally on the two projected portions 14b. This enables the conducting plate 18 to be pushed reliably.

Also, since it is inevitable that some variations occur in a battery capacity of each of the single batteries 20, if the capacity of the single battery that can strike and come into contact with the pushing member 14, out of the single batteries 20 incorporated into the module 30, is large accidentally, for example, even when overcharge occurs, in some cases, generation of gas is delayed in the single battery having a large battery capacity. Due to this, even when any one of the single batteries 20 expands, its pushing force is not fully transferred to the pushing member 14 and, as a result, before currents are interrupted by the pushing member 14, there is a possibility that ignition or breakage caused by increases of internal pressures thereof occurs in a single battery having a comparatively small battery capacity. In the module 30 of the embodiment, a battery capacity of each of the single batteries 20 being able to strike and come into contact with the pushing member is set to be 5% smaller than that other single batteries 20. Owing to this, while each of the single batteries 20 is in a state of overcharge, the internal pressure of the single battery 20a increases rapidly compared with other single batteries 20, thereby enabling pushing force generated by expansion of the single battery 20a to be transferred to the pushing member 14 and, as a result, it is made possible to interrupt charging currents reliably. Also, in the module 30 of the embodiment, the electrode group 4 is formed by a stacking method in which positive electrode and negative electrode plates are alternately stacked. This enables the single battery 20a having a battery capacity being smaller than that of each of the single batteries 20 to be easily fabricated by decreasing the number of the positive and negative electrode plates.

Also, in the embodiment, the example in which the pressure receiving plate 13 is bonded to the plane portion on the pushing member 14 side of the single battery 20a is shown, however, the present invention is not limited to this and the module may be configured so that the plane portion directly strikes and comes into contact with the pushing member 14. By employing a structure in which the pushing member 14 is pushed through the pressure receiving plate 13 having an area being wider than that of the pushing member 14 and having rigidity, the expansion force generated when any one of the single batteries 20 and single battery 20a is transferred to the pushing member 14, thus enabling reliable interruption of currents. Also, in the embodiment, the example in which the pressure receiving plate 13 and the pushing member 14 employ non-conductive materials is shown, however, the present invention is not limited to this and, so long as the film 1, 1' uses a non-conductive material, the pushing member 14 may use a conductive material.

Also, in the embodiment, the example in which the conducting path on the negative electrode side is made up by connecting the conducting plate 18 to the negative electrode external terminal 16 of the module 30 and by connecting the conducting plate 17 to the negative terminal of the single battery 20a is shown, however, the present invention is not limited to this. For example, the conducting plate 18 may be connected to the negative electrode terminal of the single battery 20a and the conducting plate 17 may be connected to the negative electrode external terminal 16. Of course, it is possible to provide a mechanism to interrupt currents by using the pushing member 14 on the positive electrode side. In this case, the above configuration can be realized by connecting the conducting plate 18 to the positive electrode external terminal 15 of the module 30 and by connecting the conducting plate 17 to the positive electrode terminal of each of the single batteries 20 located on the outermost side being opposite to the single battery 20a.

Also, in the embodiment, the example in which the battery capacity of the single battery 20a is 5 percent smaller than that of each of the single batteries 20 is shown, however, the present invention is not limited to this and the capacity of the battery 20 may be made smaller by a range of 3 percent to 9 percent. If a difference in the battery capacity between each of the single batteries 20 and the single battery 20 is less than 3 percent, with respect to capacity variations between batteries, it is difficult to obtain a reliable difference in the battery capacity, that is, it is difficult to reliably make the battery capacity of the single battery 20a smaller than that of each of the single batteries 20 and, to the contrary, if the difference in the battery capacity between each of the batteries 20 and the single battery 20a exceeds 10 percent, the difference in the battery capacity between each of the single batteries 20 and the single battery 20 becomes too large and, as a result, in the battery having the smaller capacity, load becomes larger at a time of charging, which causes the capability in terms of a battery life in the module 30 as a whole to be impaired and, therefore, the difference in the battery capacity is preferably within 3 percent to 9 percent. Also, in the embodiment, the example in which the electrode group 4 is configured by the stacking method in which the positive and negative electrode plates are alternately stacked is shown, however, the present invention is not limited to this and the electrode group configured by a winding method in which positive and negative electrode plates are wound may be used. In this case, by decreasing a length of each of the positive electrode plate and negative electrode plate to be wound, the battery capacity of the single battery 20a can be made smaller than that of each of the single batteries 20.

Also, in the embodiment, the example is shown in which the conducting plate 17 is coupled to the conducting plate 18 by using FSW (Friction Stir Welding), however, resistance welding may be also used for the coupling. In the embodiment, the example in which the conducting plates 17 and 18 are made of an aluminum alloy is shown, however, there is no limitation as long as the material is conductive. To achieve lightweightness of the module as a whole, an aluminum alloy may be preferably used. Additionally, in the embodiment, the example in which the two projected portions 14b of the pushing member 14 are formed is shown, however, the present invention is not limited to this and three or four projected portions may be formed. It is needless to say that the shape of the projected portions is not limited to the cylindrical shape. In this case, it is necessary that the through-holes 17a having the same number as the projected portions 14b are formed on the conducting plate 17 in a manner to correspond to the projected portions 14b (also in terms of shapes). Moreover, in the embodiment, the example in which the shape of each of the pressure receiving plate 13, base portion 14a of the pushing member 14, and conducting plates 17 and 18 is circular is shown, however, their shapes may be rectangular or the like.

In the embodiment, the example in which the lithium ion secondary battery is used as each of the single batteries 20 is shown, however, the present invention is not limited to this and a secondary battery using a film as an exterior body may be used as the single battery. It is also needless to say that there is no limitation to a material such as a positive or negative electrode active material to be used for a lithium ion secondary battery. Also, in the embodiment, the example in which films obtained by laminating PP films, aluminum foil, and PET film is used as the exterior body of each of the single batteries 20 is shown, however, no limitation is imposed on a structure of the film and a film having any structure can be used as long as the film is made of a flexible material that can be used as a battery container. Also, in the embodiment, the example in which 8 pieces of single batteries 20 are connected in series is shown, however, the present invention is not limited to the number of single batteries and the batteries may be connected not only in series but also in series and parallel.

Example

Next, an example of the module 30 fabricated according to the method of the embodiment is explained. Moreover, as an comparative example, a module having the same configuration as the example module of the embodiment except that the pushing member is removed and that currents can not be interrupted was fabricated.

Effects of ensuring safety obtained when the modules are charged at a current of 3. 2A were evaluated by using a regulated power source on 50 pieces of the modules fabricated according to the embodiment and 50 pieces of the comparative examples. The result from the evaluation shows that fire occurred in 6 pieces out of 50 pieces of the comparative example modules from which the pushing member had been removed and an explosion occurred in the remaining 44 pieces of the modules 100 to 120 minutes later. On the other hand, in the 50 pieces of the embodiment modules, the entire coupling portion 21 is broken approximately 90 minutes later from the start of passage of currents and, as a result, currents were interrupted and no explosion occurred. This made it clear for the module to reliably interrupt currents at a time of expansion of any one of the single batteries 20 and single battery 20a. Therefore, it was confirmed that the module 30 of the present invention was more lightweight and higher in energy density compared with the conventional module using the cylindrical and sealed-type single batteries and capable of reliably interrupting currents at a time of an increase in internal pressure, thus providing a very excellent function from a viewpoint of safety.

Second Embodiment

Next, a secondary battery module of the second embodiment is described below. Configurations of each of the single batteries 20 and single battery 20a and a structure in which 8 pieces of single batteries 20 are stacked of the second embodiment are the same as in the first embodiment and the same reference numbers are assigned to members or components having the same functions as in the first embodiment and descriptions thereof are omitted accordingly. Hereinafter, points being different from those in the first embodiment are explained.

(Constitution)

Figure 3:
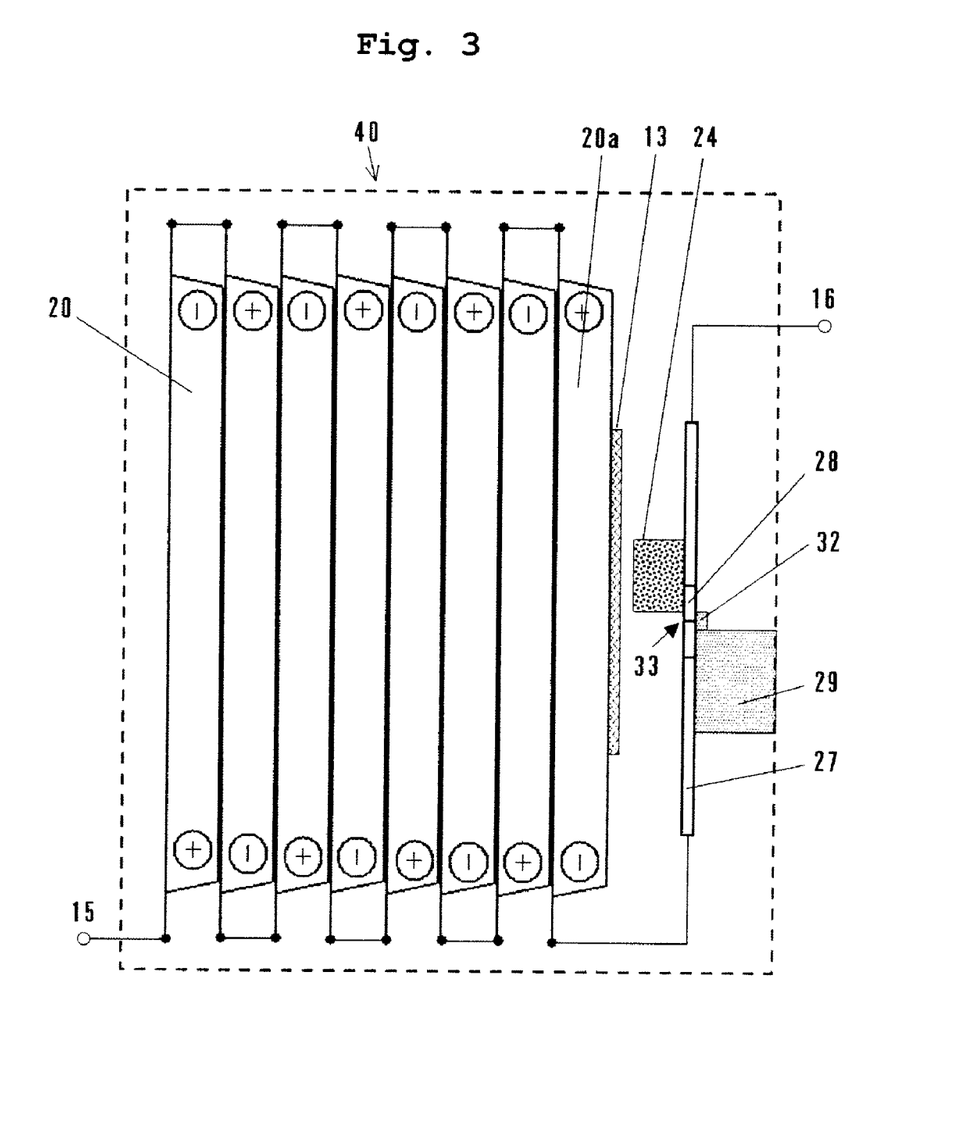
FIG. 3 is a cross-sectional view schematically showing the secondary battery module according to the second embodiment of the present invention.

As shown in FIG. 3, the secondary battery module (hereinafter simply a "module") 40 is made up of 8 pieces of single batteries 20 each using a laminate film as a battery container. An entire module 40 including 8 pieces of single batteries 20 and lead plates described later is incorporated in a frame (not shown) made of an aluminum alloy. Moreover, in the embodiment, a battery capacity of the single battery 20a is 5 percent smaller than that of each of the single batteries 20. The other single batteries 20 disposed on a side opposite to the single battery 20a are supported by the frame (not shown) of the module 40.

On a side of a pressure receiving plate 13 opposite to the single battery 20a is disposed a pushing member 24 adapted to interrupt currents when any one of the single batteries 20 and single battery 20a expands. The pushing member 24 is supported by a guide member (not shown) also supported by a frame (not shown). The pushing member 24 is made of a non-conductive material. The pushing member 24 is formed so as to have a circular plate one surface of which can strike and come into contact with the pressure receiving plate 13. A size (area) of the pushing member 24 is set to be smaller than that of the pressure receiving plate 13.

Figure 4:
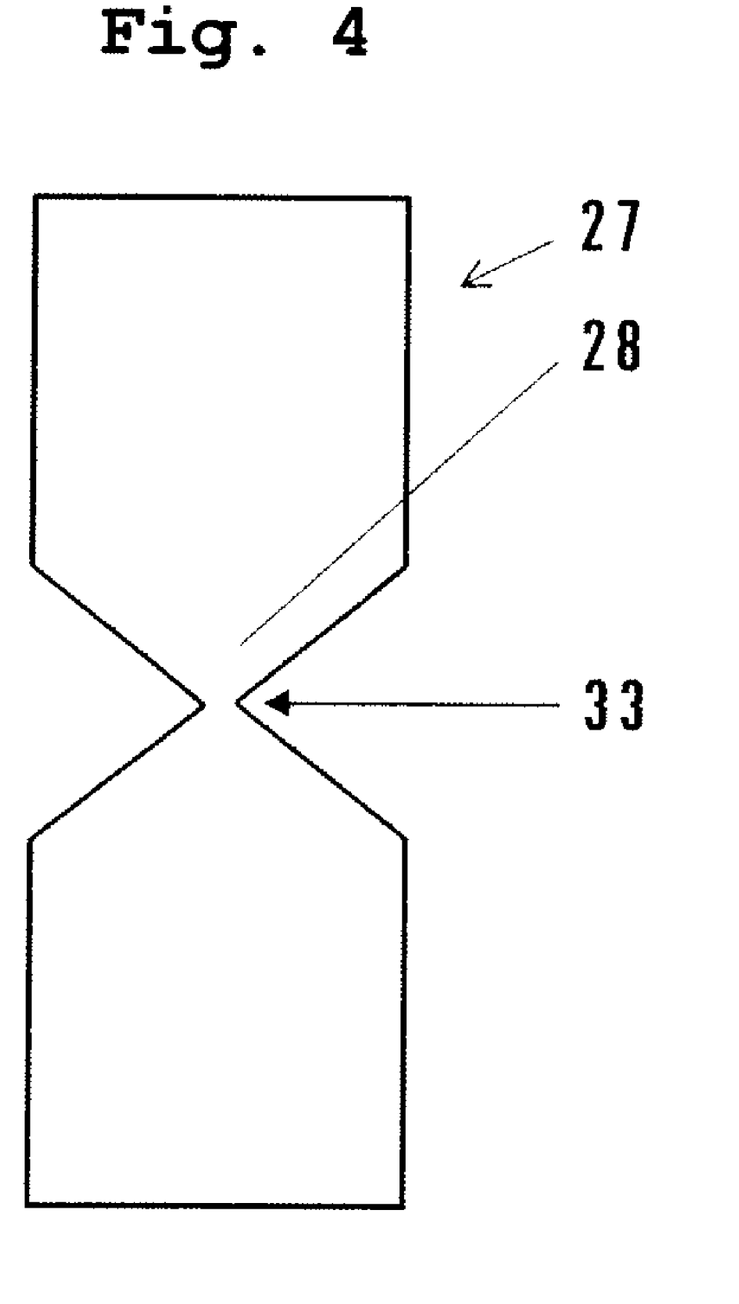
FIG. 4 is a plane view showing a lead plate embedded in the secondary battery module according to the second embodiment of the present invention.

On a side of the pushing member opposite to the pressure receiving plate 13 is disposed a rectangular lead plate 27 made of an aluminum alloy serving as a connecting member. That is, the lead plate 27 is placed so as to face the single battery 20a. In an approximately central portion of the lead plate 27 in a longitudinal direction is formed a triangular notch using a trimming method by a pressing process on both sides in a width direction orthogonal to a longitudinal direction. That is, the lead plate 27 has a narrowed portion 28 in an approximately central portion. In the narrowed portion 28, a central portion 33 having a smallest width makes up a weak portion of the lead plate 27. The lead plate 27 is made up of an aluminum alloy plate A1050 being 1 mm in thickness and a width of its central portion 33 is set to be 1 mm. As a result, a cross-sectional area of the central portion 33 in the lead plate 27 is 1 mm². A portion above the central portion 33 of the lead plate 27 is positioned in a manner to correspond to the pushing member 24.

On a side of the lead plate 27 opposite to the pushing member 24 is disposed a supporting member to support the lead plate 27. The supporting member 29 is formed so as to be circular and is made of a non-conductive material such as a phenolic resin or the like. On one side of the supporting member 29, the lead plate 27 is supported by a portion below the central portion 33. As a result, the pushing member 24 and supporting member 29 are positioned top side down relative to the central portion 33 of the lead plate 27. A portion of the supporting member 29 on another face side and a portion above the central portion 33 of the lead plate 27 are supported by a frame (not shown). The supporting member 29 has a projected portion 32 serving a separating member on its upper end on the lead plate 27 side. The projected portion 32 is formed integrally with the supporting member 29. The projected portion 32 is of a tongue-like shape and is disposed in a position corresponding to the central portion 33 of the lead plate 27. In other words, the projected portion 32 is positioned in a manner to contact with the narrowed portion 28 containing the central portion 32.

One end of the lead plate 27 sandwiching its central portion 33 is connected to a terminal of a negative electrode of the single battery 20a and the other end also sandwiching its central portion 33 is connected to an external terminal 16. As a result, the negative electrode external terminal 16 is connected to the negative electrode terminal of the single battery 20a through the lead plate 27 including the central portion 33 and the negative electrode terminal of the single battery 20a, lead plate 27, negative electrode external terminal 16 make up a conductive path on the negative electrode side.

(Actions or the Like)

Next, actions or the like of the module 40 of the second embodiment are described.

In the module 40 of the second embodiment, one end of the lead plate 27 sandwiching its central portion 33 is connected to a negative terminal of the single battery 20a and the other end of the lead plate 27 is connected to the negative electrode external terminal 16. Therefore, during an ordinary use of the module 40, power from the single batteries 20 and single battery 20a is output through the lead plate 27 to the negative electrode external terminal 16.

Also, in the module 40 of the second embodiment, the lead plate 27 is disposed in a manner to face the single battery 20a and the pushing member 24 is interposed between the single battery 20a and the lead plate 27. That is, the single battery 20a, pushing member 24, and lead plate 27 are disposed in this order. Batteries making up the module 40 get into an abnormal state if overcharge should occur due to a trouble of the module or when the module is used in an atmosphere of high temperatures, thus causing gas to be generated in the batteries by evaporation or decomposition of an electrolytic solution and internal pressures to be increased. When any one of the single batteries 20 and single battery 20a expands, since the single battery 20 disposed on a side opposite to the single battery 20a is supported by the frame (not shown) of the module 40, the pressure plate 13 is pushed toward the pushing member 24, thereby striking and coming into contact with the pushing member 24. As a result, the pushing member 24 is pressed on the lead plate 27 and is moved and the lead plate 27 is pushed by the pushing member 24. As a result, the central portion 33 of the lead plate 27 is broken, thereby causing the single battery 20a and the negative electrode external terminal 16 to be disconnected and the conductive path on the negative electrode side of the module 40 to be interrupted. Therefore, in the module 40, further flowing of currents is prevented and it is made possible to ensure safety at a time of a rise in internal pressure.

Moreover, according to the module 40 of the second embodiment, the supporting member 29 is configured to have a tongue-like projected portion 32 on an upper end of the lead plate 27 and the projected portion 32 is disposed so as to be in contact with the narrowed portion 28 including the central portion 33 of the lead plate 27. Due to this, after the rupture of the central portion 33, the broken end on an upper side of the broken central portion 33 goes around the broken end on a lower side via the projected portion 32. This enables both the broken ends of the central portion 33 to be separated from each other. Even if the internal pressure thereof decreases due to the breakage of films of the battery container, lowering of the battery temperature or the like, the broken lead plate 27 does not return back to its original state, which can prevent flowing of currents caused by another contact between both the broken ends. Further, in the module 40 of the second embodiment, the supporting member 29 is placed on a side opposite to the pushing member 24 of the lead plate 27 and the pushing member 24 and supporting member 29 are disposed top side down relative to the central portion 33 of the lead plate 27. Therefore, when either of each of the single batteries 20 or the single battery 20a expands, since the pushing member 24 is pushed, the central portion 33 can be reliably broken.

Also, variations inevitably occur to some extent in a battery capacity of each of the single batteries 20 and, therefore, if a battery capacity of the single battery, that can strike and come into contact with the pushing member 24, out of single batteries 20 incorporated in the module 40 is accidentally large, even when overcharge occurs, in some cases, the evolution of gas is delayed in a single battery having a large battery capacity. Due to this, even when any one of the batteries 20 expands, pushing force is not fully transferred to the pushing member 24 and, therefore, there is a possibility that explosion caused by the ignition or increased internal pressure occurs in the single battery having a comparatively small battery capacity before currents are interrupted due to activation of the pushing member. Also, in the module 40 of the second embodiment, a battery capacity of the single battery 20a that can strike and come into contact with the pushing member 24 is set to be smaller than that of other single batteries 20. As a result, in the case of overcharge or the like, the internal pressure of the single battery 20a increases rapidly compared with other single batteries 20, pushing force generated by expansion is transferred to the pushing member 24, thereby enabling reliable interruption of charging currents. Additionally, in the module 40 of the second embodiment, the electrode group 4 of the second embodiment is formed by a stacking method in which positive and negative electrode plates are alternately stacked. This enables the single battery 20a having a battery capacity being smaller than that of each of the single batteries 20 to be easily fabricated by decreasing the number of the positive and negative electrode plates.

Also, according to the module 40 of the second embodiment, a change in a coupling area caused by variations occurring when two coupling members as used in the first embodiment are bonded by the resistance welding method or the like can be avoided, thereby enabling an actuating pressure to be stabilized and reliable operations to be ensured.

Also, in the second embodiment, the example is shown in which the lead plate 27 has the narrowed portion 28 in which a triangular notch is formed using the trimming process by a pressing process, however, the present invention is not limited to this and any lead plate is acceptable so long as it has a narrowed portion. For example, a rectangular notch may be formed or, instead of forming the notch, a thickness of the lead plate may be made smaller. Moreover, though no limitation is imposed on a method of forming the notch, the trimming method used in the present embodiment can provide excellent dimensional stability, which enables an actuating pressure (pressure at a time of breakage of the lead plate 27 to be stabilized and reliable operations to be ensured.

In the embodiment, the example is shown in which the conducting path on the negative electrode is made up by connecting one end of the lead plate 27 to the negative electrode external terminal 16 and connecting the other end of the lead plate to the negative electrode of the single battery 20a, however, the present invention is not limited to this. For example, a current interrupting mechanism using the pushing member 24 may be placed on the positive electrode side. In this case, one end of the lead plate 27 may be connected to a positive electrode terminal of the single batteries 20 disposed on a side opposite to the single batteries 20a and its another end may be connected to the positive electrode external terminal 15.

Moreover, in the embodiment, a battery capacity of the single battery 20a is 5 percent smaller than that of each of the single batteries 20, however, the present invention is not limited to this. If a difference in the battery capacity between each of the single batteries 20 and single battery 20a is less than 3 percent, with respect to capacity variations among batteries, it is difficult to obtain a reliable difference in the battery capacity, that is, it is difficult to reliably make the battery capacity of the single battery 20a smaller than that of each of the single batteries 20 and, to the contrary, if the difference in the battery capacity exceeds 9 percent, the difference in the battery capacity among single batteries becomes too large and, as a result, in the battery having the smaller capacity, load becomes the larger at a time of charging, which causes the capability in terms of a battery life of the module 40 as a whole to be impaired and, therefore, the difference in the battery capacity is preferably within 3 percent to 9 percent. Additionally, in the embodiment, the example is shown in which the electrode group 4 is formed by a stacking method in which positive and negative electrode plates are alternately stacked, however, the present invention is not limited to this and the electrode group may be configured by a winding method in which positive and negative electrode plates are wound and, in this case, by shortening the positive and negative electrode plates to be wound, the battery capacity of the single battery 20a can be made smaller than that of each of the single batteries 20.

In the embodiment, the example is shown in which the pushing member 24 is disposed above the central portion 33 of the lead plate 27 and the supporting member 29 is disposed below the central portion 33, however, the present invention is not limited to this and the pushing member 24 and supporting member 29 may be disposed at opposite sides relative to the central portion 33. Also, in the embodiment, the example is shown in which the projected portions 32 are formed integrally with the supporting member 29, however, the present invention is not limited to this, and the projected portions 32 may be formed integrally with the pushing member 24. In this case, the projected portions 32 may be formed at an end of the pushing member 24 on the supporting member 29 side. Moreover, instead of forming the projected portions 32 integrally with the supporting member 29 or pushing member 24, another separating member corresponding to the projected portions 32 may be disposed. In this case, the separating member may be configured in a manner to be supported by the frame (not shown) of the module 40. Also, in the embodiment, the example is shown in which the tongue-like projected portions 32 are used, however, any shape is acceptable as long as the projected portions 32 are interposed between broken ends of the central portions 33 of the lead plate 27.

Also, in the embodiment, the example is shown in which the lead plate 27 is made of the aluminum alloy, however, there is no restriction so long as a material having conductivity is used. To achieve the lightweightness of an entire module, the aluminum alloy is preferably employed. Instead of forming the lead plate 27 to be of a plate-like shape, for example, a shape is usable in which both the ends of the lead plate 27 are bent respectively toward the negative electrode external terminal 16 side and negative electrode side of the single battery 20a. Furthermore, in the embodiment, each of the pressure receiving plate 13, pushing member 24, and supporting member 29 is formed to have a circular shape, however, the present invention is not limited to this and, for example, a rectangular shape may be employed.

Further, in the first and second embodiments, the secondary battery module constituted by a plurality of single batteries (unit cells) was shown. However, the present invention is not limited to this. Namely, the present invention is applicable to a secondary battery having one unit cell (a single battery).

Example

Next, an example of the module 40 fabricated according to the second embodiment is described. Moreover, as a comparative example, a module was manufactured in the same method as used in the above example except that the projected portions 32 of the pushing member 24 were removed.

To check and evaluate safety of modules 40, whether or not ignition occurred when charging was performed on one hundreds of the example modules and the comparative example modules by using a regulated power source at 5 V and 1 CA (3.2 A) to the extent that overcharge occurs. The table 1 shows results from the evaluation of safety.

TABLE 1

|  | Tongue-like projected portion | Ignition | No ignition |
| --- | --- | --- | --- |
| Example | presence | 0 | 100 |
| Comparative Example | absence | 17 | 83 |

In either of above example and comparative example modules, single batteries 20 and single battery 20a expanded due to gas generated internally and the central portions 33 of the lead plate 27 were broken and, as a result, currents are interrupted. Thereafter, in 17 out of 100 pieces of the comparative example modules from which projected portions 32 of the supporting member 29 were removed, the lead plate 27 again came into contact with the single battery 15 to 30 minutes after currents were interrupted, thus allowing currents to pass through for several minutes and again currents to be interrupted and this phenomenon were repeated several ten times and ignition occurred at last. On the other hand, in the 100 pieces of the example modules 40 having projected portions 32 in its supporting member 29, nothing happened and all the modules stopped with safety. This showed clearly that the projected portions 32 could prevent flowing of currents after the current interruption realized by using the pushing member 24, thus thereby stopping the function of the module 40 with safety. Therefore, it was confirmed not only that the module 40 was lightweight and high in energy density compared with the conventional module but also that the module 40 could reliably interrupt currents at a time of a rise in internal pressure and have excellent functions in terms of safety and a very large industrial value.

INDUSTRIAL APPLICABILITY

The present invention provides a secondary battery module capable of ensuring safety at a time of abnormal battery operations by using a film-type secondary battery and of contributing to manufacturing and marketing of the secondary battery module and, therefore, the present invention provides industrial applicability.

What is claimed is:

1. A secondary battery module having a single battery housed in a battery container made of a flexible member or a plurality of unit cells each being disposed in a layer-stacked state, housed in a battery container made of a flexible member and connected to one another in series or in series and parallel comprising: a connecting member placed so as to face a single battery or a unit cell disposed at one end of said plurality of unit cells and to connect said single battery or said unit cell disposed at one end of said plurality of unit cells with an external output terminal; and a pushing member placed between said single battery or said unit cell disposed at one end of said plurality of unit cells and said connecting member; wherein said pushing member, when said single battery or any one of said plurality of unit cells expands, breaks off the connection established by said connecting member between said single battery or said unit cell disposed at one end of said plurality of unit cells and said external output terminal, wherein said connecting member comprises a first connecting member having through-holes being placed so as to face said single battery or said unit cell disposed at one end of said plurality of unit cells and a second connecting member disposed on a side of said first connecting member opposite to said pushing member so as to face said first connecting member and having a coupling portion with said first connecting member, and wherein said pushing member has projected portions being able to pass through said through-holes formed in said first connecting member, and wherein one of said first connecting member and said second connecting member is connected to said single battery or said unit cell disposed at one end of said plurality of unit cells and another of said first connecting member and said second connecting member is connected to said external output terminal and, when said single battery or any one of said plurality of unit cells expands, said projected portions of said pushing member pass through said through-holes formed in said first connecting member to cause rupture of said coupling portion, and wherein a central portion of said second connecting member is projected to a side of said first connecting member and said coupling portion is formed in the projected central portion.

2. The secondary battery module according to claim 1, wherein said first connecting member has said through-holes in proximity to said coupling portion.

3. The secondary battery module according to claim 2, wherein said pushing member has a plurality of projected portions and a length of projection of each of said plurality of projected portions is the same and said through-holes having the same number as said plurality of projected portions are formed in said first connecting member.

4. The secondary battery module according to claim 1, wherein a resin plate having rigidness is bonded, in a fixed state, to said single battery or said unit cells disposed at one end of said plurality of unit cells.

5. The secondary battery module according to claim 1, a battery capacity of said unit cell disposed at one end of said plurality of unit cells is smaller than that of each of said plurality of unit cells other than said unit cell disposed at one end of said plurality of unit cells.

6. The secondary battery module according to claim 1, wherein a battery capacity of said unit cell disposed at one end of said plurality of unit cells is 3 percent to 9 percent smaller than that of each of said plurality of unit cells other than said unit cell disposed at one end of said plurality of unit cells.

* * * * *

UNITED STATES PATENT AND TRADEMARK OFFICE
CERTIFICATE OF CORRECTION

| | | |
|---|---|---|
| PATENT NO. | : 8,080,328 B2 | Page 1 of 1 |
| APPLICATION NO. | : 11/942236 | |
| DATED | : December 20, 2011 | |
| INVENTOR(S) | : Mikio Oguma and Takenori Ishizu | |

It is certified that error appears in the above-identified patent and that said Letters Patent is hereby corrected as shown below:

On the Title Page:

Item (54) Title: delete "BREAL" and insert --BREAK--

In the Specifications:

Column 1, Line 2, delete "BREAL" and insert --BREAK--

Signed and Sealed this
Fourteenth Day of February, 2012

David J. Kappos
*Director of the United States Patent and Trademark Office*